(12) United States Patent
Tosi et al.

(10) Patent No.: US 9,068,431 B2
(45) Date of Patent: *Jun. 30, 2015

(54) FLOW SENSING APPARATUS AND METHODS FOR USE IN OIL AND GAS WELLS

(75) Inventors: Luis Phillipe Tosi, Houston, TX (US); William David Norman, The Woodlands, TX (US); David Reuel Underdown, Houston, TX (US); Krystian Maskos, Houston, TX (US)

(73) Assignee: Chevron U.S.A. Inc., San Ramon, CA (US)

(*) Notice: Subject to any disclaimer, the term of this patent is extended or adjusted under 35 U.S.C. 154(b) by 504 days.

This patent is subject to a terminal disclaimer.

(21) Appl. No.: 13/460,223

(22) Filed: Apr. 30, 2012

(65) Prior Publication Data

US 2013/0284431 A1    Oct. 31, 2013

(51) Int. Cl.
| | |
|---|---|
| *E21B 47/00* | (2012.01) |
| *E21B 47/12* | (2012.01) |
| *G01F 1/64* | (2006.01) |
| *G01V 3/20* | (2006.01) |
| *G01F 1/74* | (2006.01) |
| *E21B 47/10* | (2012.01) |

(52) U.S. Cl.
CPC . *E21B 47/00* (2013.01); *G01V 3/20* (2013.01); *G01F 1/64* (2013.01); *G01F 1/74* (2013.01); *E21B 47/102* (2013.01)

(58) Field of Classification Search
CPC ....... E21B 47/00; E21B 47/12; E21B 17/028; E21B 47/01; E21B 17/003; G01F 1/64; G01F 1/74; G01F 1/58; G01V 3/20; G02B 26/0841; G02B 6/357

USPC .............. 166/250.01, 65.1, 66, 265; 310/309; 174/24; 209/54, 46

See application file for complete search history.

(56) References Cited

U.S. PATENT DOCUMENTS

| | | | |
|---|---|---|---|
| 3,638,054 A | 1/1972 | Honigsbaum | |
| 7,819,181 B2* | 10/2010 | Entov et al. | 166/66 |
| 2009/0167310 A1* | 7/2009 | Smits | 324/353 |
| 2011/0210645 A1* | 9/2011 | Mason | 310/309 |

FOREIGN PATENT DOCUMENTS

| | | |
|---|---|---|
| DE | 1195960 | 7/1965 |
| FR | 2250981 | 6/1975 |
| WO | 2012/1482628 | 11/2012 |

OTHER PUBLICATIONS

International Search Report for PCT/US2013/038049 date Aug. 6 2013, 3 pages.

* cited by examiner

*Primary Examiner* — Shane Bomar
*Assistant Examiner* — Wei Wang
(74) *Attorney, Agent, or Firm* — John E. Vick

(57) ABSTRACT

The present invention is directed to methods for assessing flow-induced electrostatic energy in an oil and/or gas well wherein electric current or electrostatic potential or both are measured to produce data correlating to at least one flow characteristic of a tubular segment in the well. In some embodiments, electric current and electrostatic potential are produced separately for a plurality of segments, and measured. The system further may adjust at least one flow characteristic of a segment of the well to increase hydrocarbon production from the well.

15 Claims, 4 Drawing Sheets

FLOW SENSING APPARATUS AND METHODS FOR USE IN OIL AND GAS WELLS

FIELD

The field is directed to sensing methods and systems for determining and evaluating hydrocarbon fluid flow characteristics within subterranean formations.

BACKGROUND

Modern oil and gas wells are expensive and complicated. A large financial and technical investment is made in constructing a wellbore that may extend for miles below a geological surface. The subterranean formation through which the wellbore passes may have multiple producing zones or segments that are separated by hundreds or thousands of feet. Another very large financial and technical investment is made to install completion hardware and/or screens in the wellbore to prevent sand and particle penetration into the wellbore, thereby facilitating long-term production of oil and gas fluids. Once installed, it is very expensive and time consuming to remove such hardware. Thus, methods and techniques to accomplish objectives in a wellbore without the need to remove completion hardware are very desirable.

It has been observed that the fluid and solid materials generated by a given segment of an oil and gas producing formation changes over time during the twenty or thirty year life of a producing well. After expensive and complex completion hardware is installed in the well, it usually is cost prohibitive to remove such hardware to evaluate the production characteristics of the well in particular zones or segments of the well. For example, a particular producing zone after a number of years may begin producing excess amounts of water. Large volume water production is very costly to treat for disposal, and it displaces the volume of oil or gas that otherwise could be produced up the wellbore. Late in the life of many wells, the volume of water produced usually is much greater than the amount of oil produced. Currently, it is very difficult or impossible to determine which zone of the well is producing desirable oil or gas, and which zone is producing mostly undesirable water, especially if sand-control hardware is present in the completion design. Access to the pay-zones is limited due to many design constraints. The fluids from all of the zones typically are produced upwards into a common wellbore that extends to the geological surface.

It would be highly desirable if there was an apparatus, method or system for determining the flow characteristics downhole in one or more segments of a well. Such flow characteristics as the volume of water produced and the flow rate in a given segment of a well could be very useful in managing production of oil and gas from a well. Furthermore, once that information is known, it would be desirable to provide a method for adjusting the flow characteristics or quantity of a particular zone or segment of a well to increase the overall hydrocarbon production from the well.

SUMMARY

The present invention is directed to methods, systems and apparatus for determining or sensing the characteristics of fluid flow in segments of a well. For example, oil/water ratio, localized flow rates, and location of production fluids each are of great interest for completion design and reservoir optimization during the productive life of a well. Understanding the changes in the oil to water ratio as a function of time allows oil and gas production engineers to understand the reservoir and even control or alter a specific zone in the reservoir to maximize overall oil and gas production. For example, a valve can be actuated to open or close to increase or decrease flow characteristics of a particular segment of a well. Detailed information of flow characteristics in various segments of a well must be known before steps may be taken to maximize production.

Localized flow rates allow for zone monitoring in a commingled production with multizone wells. Optimization may be achieved using a valve or actuator. Understanding the location of the flow within a specific zone or segment of a well allows engineers to understand the number of perforations that are open, their location, and the need for reservoir inflow remediation techniques to maximize production of oil and gas from the well.

An electrostatic screen may be used to generate a current and voltage. Analysis of the current output may be accomplished to infer oil/water ratio or water breakthrough points. Localized flow rate and the specific location of flow within a single zone may be revealed. A sand screen within a lower completion may be employed.

A flow of fluids passes through a dielectric membrane between two electrodes. In one embodiment, the sand screen function for sand control may be carried out by the upstream electrode. Multiple joints or segments may be built and electrically connected in parallel to create a modular, spatially segmented flow analysis tool along the length of the well. The signature is a strong function of the dielectric fluid velocity, as well as the overall dielectric properties of the fluid. By using multiple parallel segments, individual screen current signals may be diagnosed for their form and behavior over time. A relative flow rate may be inferred. Typically, the flow rate is directly proportional to the amplitude of the current signature produced. The specific signature for oil/water ratio will be characterized for the system. But, such a signature may be inferred by the decrease in the current amplitude over time up to the point at which the screen no longer produces power because a conductive fluid is flowing through the membrane.

In some embodiments the present invention is directed to methods of providing sensing devices in a well. Such devices operate by measuring the values of electrostatic energy downhole.

A method and system of determining flow characteristics in at least one segment of a hydrocarbon-producing well is provided, in part by generation of electrostatic energy. The method comprises the steps of: providing at least one tubular segment electrically connected to a device. The tubular segment may comprise an electrically-grounded outer upstream membrane electrode, an inner downstream membrane electrode, and a dielectric filter membrane. The membrane includes flow channels disposed between the inner and outer membrane electrodes. Substantially non-conductive hydrocarbon-based fluid is flowed as a stream through the dielectric filter membrane in at least one segment of the well. An electric current is generated having an electrostatic potential between the stream and the dielectric filter membrane. Then, a measurement is made of the electric current and perhaps also the electrostatic potential to produce data correlating to at least one flow characteristic of a segment of the well. An electrical current and electrostatic potential exists between the electrically-grounded outer upstream membrane electrode and the inner downstream membrane electrode. Multiple segments may be applied in a well, and one or more segments, or all segments, may be separately assessed for production of electrical current and electrostatic potential. The electric current or electrostatic potential may be measured to produce data correlating to at least one flow characteristic of a tubular segment, of the well.

The flow characteristic of the segment of the well may be the flow rate or volume of total liquids produced, as an example. The measuring step may include the measurement of electric current or electrostatic potential for each of the respective plurality of segments. It may be desirable to assess flow characteristics in the respective plurality of segments of the well and then adjusting at least one flow characteristic of the well to increase hydrocarbon production from the well.

An electrical current and electrostatic potential exists between the electrically-grounded outer upstream membrane electrode and the inner downstream membrane electrode. The electric current or electrostatic potential is measured to produce data correlating to at least one flow characteristic within a particular tubular segment.

BRIEF DESCRIPTION OF THE FIGURES

For a more complete understanding of the present invention, reference is made to the following Figures.

DETAILED DESCRIPTION

The methods and system of the invention include the passing of a substantially non-conductive hydrocarbon-based fluid through a membrane in one or more segments in a wellbore. The flow through the membrane generates an electrical current and electrostatic potential between the flow stream and the membrane.

Figure 1:
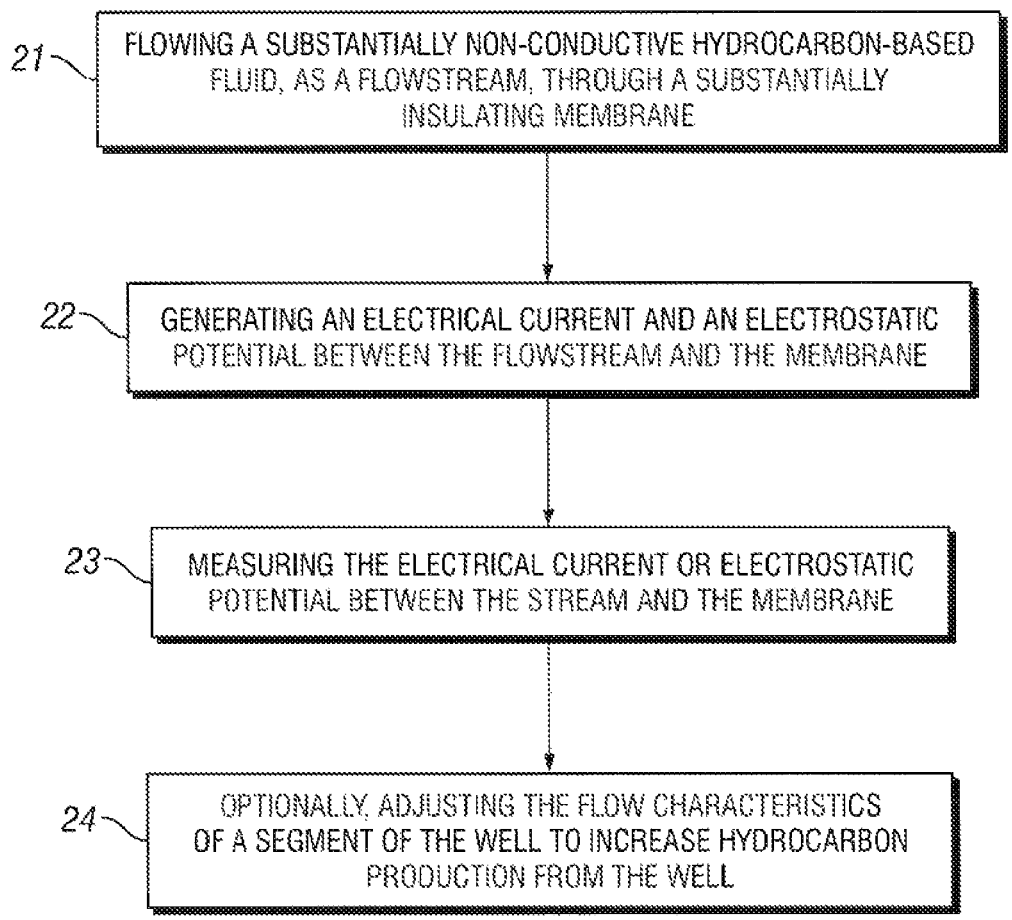
FIG. 1 illustrates a flow diagram of methods for measuring the electrical current or electrostatic potential generated downhole between a flow stream and a membrane.

With reference to FIG. 1, it is possible to flow a substantially non-conductive hydrocarbon-based fluid, as a flow stream, through a substantially insulating membrane, as seen in step 21 of FIG. 1. Then, an electrical current having an electrostatic potential may be produced between the flow stream and the membrane, as step 22. In the next step 23, it may be possible to measure the electrical current or electrostatic potential between a stream and a membrane. As an optional step 24, it may be feasible to adjust the flow characteristics of a particular segment of the well to increase hydrocarbon production from the well.

Figure 2:
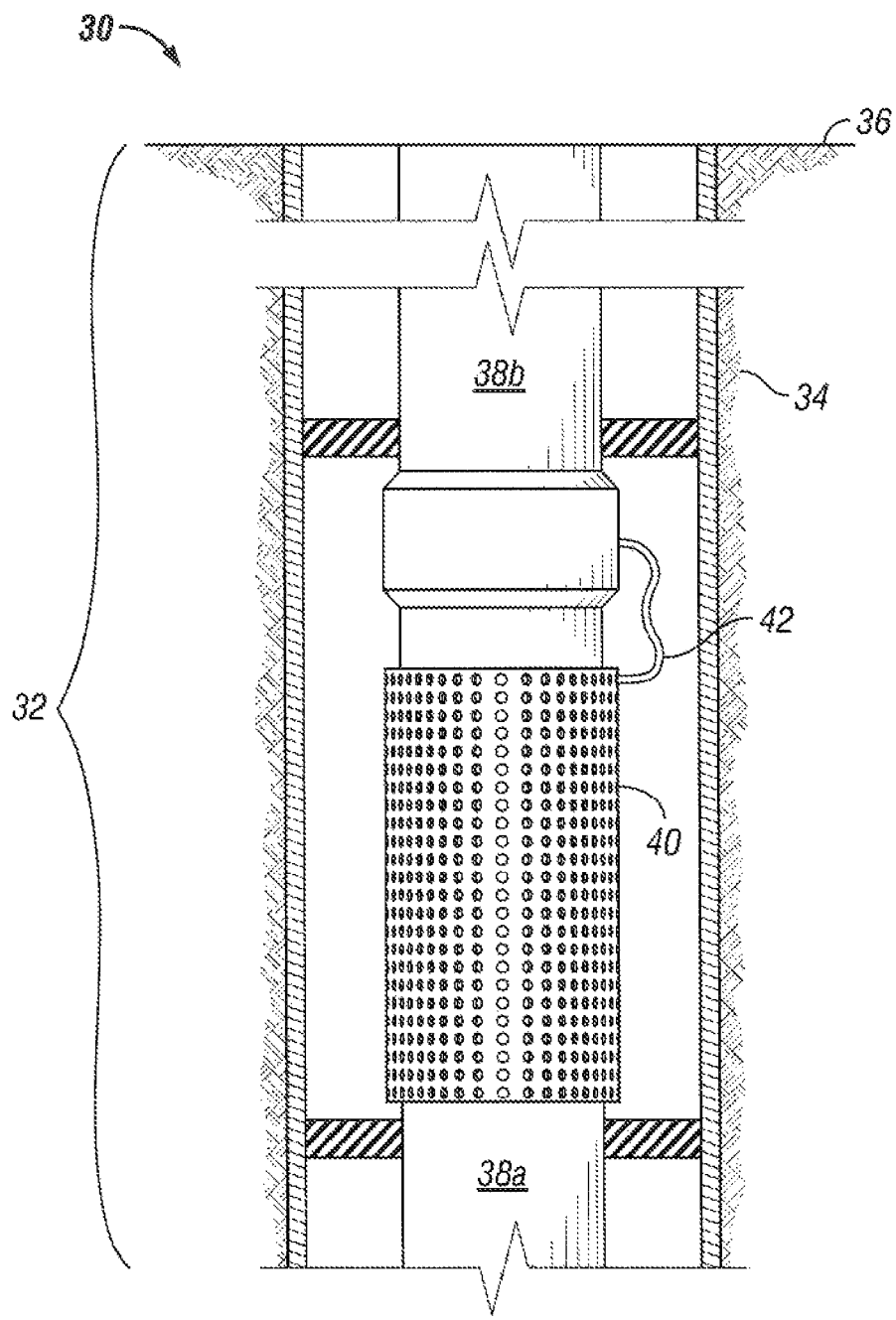
FIG. 2 depicts a system having multiple segments in a wellbore.
Figure 3:
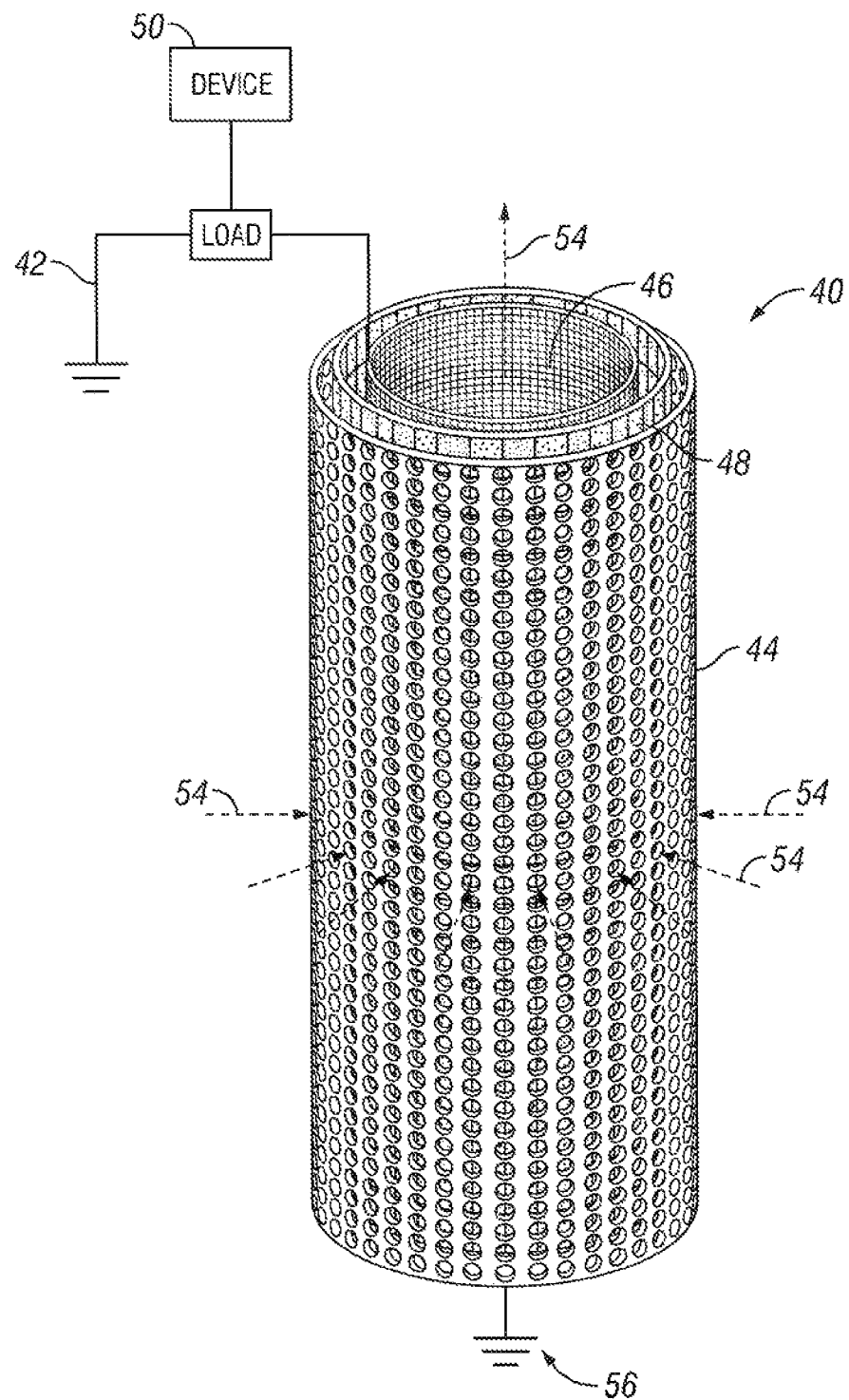
FIG. 3 depicts a portion of a membrane-bearing tubular segment of a system for determining the flow characteristics of a segment of a well by measuring current or potential of electrostatic energy.

Referring to FIGS. 2 and 3, systems for powering devices in a petroleum well by the generation of electrostatic energy downhole may comprise (as system 30 in FIG. 2) the following: a wellbore 32 in a geological formation 34 originating at a geological surface 36, extending from said surface into a geological formation 34. A plurality of tubular segments (e.g., 38a, 38b, as examples) are disposed within the wellbore, wherein said tubular segments are useful in conveying hydrocarbon-based fluids out of said wellbore. At least one membrane-bearing tubular segment 40 comprises: (i) an electrically-grounded outer upstream membrane electrode 44 (see FIG. 3), and (ii) an inner downstream membrane electrode 46, (iii) a dielectric filter membrane 48 (comprising flow channels) disposed between the inner and outer membrane electrodes 46, 44. The flow channels have an effective diameter of at least about 500 nm and at most about 200 μm. Ground electrode 56 is seen at the lower portion of FIG. 3.

At least one electrical lead establishes connectivity between the inner downstream membrane electrode 46 and the at least one device 50 (see FIG. 3). A flow 54 of substantially non-conductive hydrocarbon-based fluid is provided, wherein said flow 54 is directed through the tubular segments in an upward direction toward the surface; wherein an electrical potential exists between the electrically-grounded outer upstream membrane electrode 44 and the inner downstream membrane electrode 46, and wherein this electrical potential may be employed to power at least one device 50, which forms a load in the circuit as seen in FIG. 3.

At least one device 50 is provided that may be usefully employed downhole. Device(s) 50 may be selected from pressure sensors, temperature sensors, valves, telemetry electronics, flow meters, fluid sensing devices, and combinations thereof. In one embodiment, the device 50 is a valve that may be actuated between an open and closed position to change the amount of flow 54 that enters a membrane bearing tubular segment 40. In other embodiments, the device 50 may comprise a sliding screen that may be actuated between an open and closed position to change the amount of flow 54 that enters a membrane bearing tubular segment 40. In yet other embodiments, the device 50 may comprise telemetry electronics, as further described herein, for communication of data to the surface. Other embodiments may employ device 50 as a flow meter to measure flow and produce data that may be processed downhole in a microprocessor or may, be sent upwards out of the wellbore by a conductive wire or by way of telemetry. A device 50 also may include one or more fluid sensing devices.

In some above-described embodiments, the membrane-bearing tubular segment 40 varies in length generally from at least about 10 cm to at most about 2500 m, typically from at least about 10 cm to at most about 1000 m, and more typically from at least about 25 cm to at most about 1000 m. In some aspects of the invention, each of the outer upstream membrane electrodes 44, the inner downstream membrane electrode 46, and the dielectric filter membrane 48 are of substantially the same length.

In some embodiments, the dielectric filter membrane 48 is comprised of a material selected from the group consisting of polytetrafluoroethylene (PTFE), polyamides (Nylon), polyimides, polyvinylchloride (PVC), polyolefins, polyesters, and combinations thereof. The membrane 48 will be selected to afford the most advantageous generation of electrostatic energy while at the same time facilitating adequate flow of oil and gas from the wellbore without clogging or blockage of flow.

At least one electrical lead 42 can span a distance within the wellbore of generally from at least about 1 mm to at most about 10,000 m, typically from at least about 1 cm to at most about 5,000 m, and more typically from at least about 1 cm to at most about 1,000 m. Further, device 50 may be connected to a control circuit 76 which connects to control manifold 68 (as further shown in FIG. 4). The control manifold 68 connects multiple devices 50, 60, 70 to collate the data from multiple segments, and may send signals to the surface by way of control line 69 for analysis. Or, in other embodiments, the control line 69 could instead transmit data wirelessly to the surface. Then, once analysis is made on the ground surface by review of the data, signals may be sent along control line 69 from the surface back to the control manifold 68 for taking action to actuate a device 50, 60, 70 within the system.

This action facilitates an adjustment in flow characteristics in the well to alter a flow characteristic of the segment of the well to increase total hydrocarbon production or to limit water production.

Figure 4:
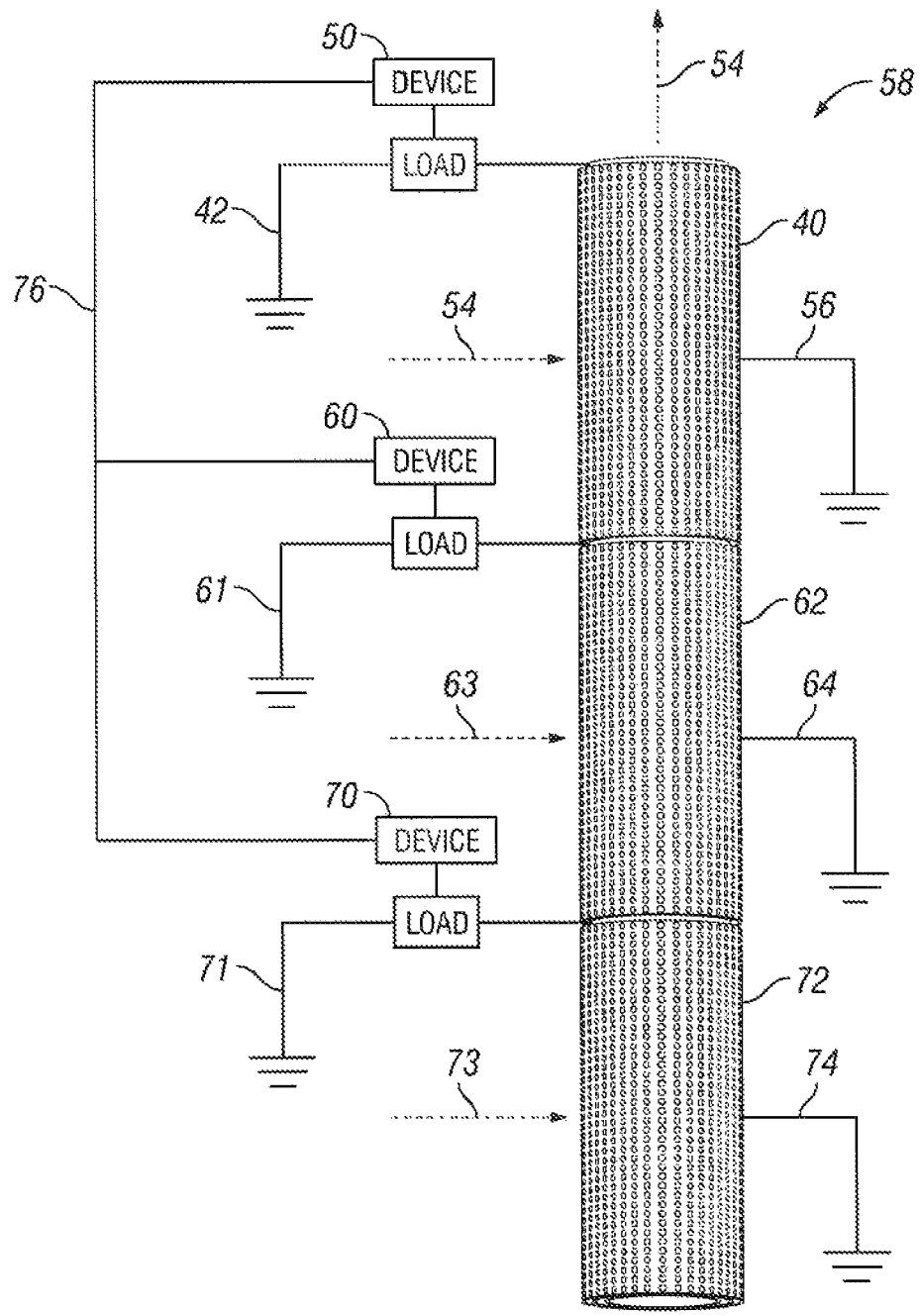
FIG. 4 illustrates multiple segments linked together to form a modular flow meter and water content gauge for downhole applications.

FIG. 4 shows a plurality of tubular segments 58. The membrane bearing tubular segment 40 seen previously in connection with FIG. 3 is shown in place connected in series to additional membrane bearing tubular segments 62 and 72. Each of membrane bearing tubular segments 40, 62 and 72 are connected, respectively, to loads and to ground electrodes 56, 64 and 74. Likewise, membrane bearing tubular segments 40, 62 and 72 are connected, respectively to electrical leads 42, 61, 71 and load devices 50, 60 and 70 respectively. The load itself may be any kind of resistive circuitry, and could be a measuring device. For example, such a measuring device could be an ammeter with a voltmeter measuring across load leads. A telemetry circuit or actuating valve also could be the load but would likely be represented as a device (50, 60, and 70) depending upon the configuration. Flow streams 54, 63, and 73 enter each of the respective segments 40, 62 and 72, causing the generation of electrostatic energy, as previously described. The load devices 50, 60 and 70 receive electrical power and may include one or more of the following: electrical storage devices, valves, sliding screens, flow meters, or flow sensing devices. In some applications, flow sensing devices may measure the stream and process that data according to predetermined protocols, and then take an action to open or close or otherwise activate a valve or sliding screen. The devices 50 may be connected to a control circuit 76 (as further shown in FIG. 4) which connects various devices 50 to collate the data or to send actuation signals to a device 50, 60, 70 in the system. In other applications, data may be collected and transmitted by telemetry or other means to the ground surface for further analysis. Then, once analysis, is complete, action may be taken to modify the mechanical arrangement of a valve, screen or other device to change the flow characteristics in a given segment, to improve overall oil or gas production from the well.

The flow 54 of substantially non-conductive hydrocarbon-based fluid may comprise a fluid selected from the group consisting of heptanes, diesel, crude oil, mineral oil, methane, pentane, hexane, combinations thereof, and the like. The flow 54 of substantially non-conductive hydrocarbon-based fluid provides a flow rate of generally between about 1 liter/minute and about 55,000 liters/minute, typically between about 1 liter/minute and about 10,000 liters/min, and in other applications between about 10 liters/minute and about 5,000 liters/minute.

Generally, the petroleum well is operable for producing hydrocarbons (oil, gas, or combinations thereof) from the subsurface, and this production of hydrocarbons may be on land or offshore. Additionally, such wells can be of a variety of types including vertical or deviated wells, cased or openhole wells, multilateral wells, and combinations of any of these.

The substantially non-conductive hydrocarbon-based fluid may be an injected fluid, a produced fluid, or a combination of injected and produced fluids. Produced fluids would be the oil or gas extracted from the reservoir, and perhaps comprising amounts of injection fluid (if injection fluid was used). In enhanced oil recovery (EOR) operations, it is contemplated that electrostatic energy could be produced, and subsequently employed, during either or both of injection and production operations.

The dielectric filter membrane 48 may be comprised of a material that is sufficiently insulating from an operational standpoint. In some embodiments, average pore size of the membrane may be generally between about 50 nm and about 50 mm, typically between about 100 nm and about 1 mm, or between about 250 nm and about 250 µm. In some such embodiments, the substantially insulating membrane is comprised of a material selected from the group consisting of polytetrafluoroethylene (PTFE), polyamides (Nylon), polyimides, polyvinylchloride (PVC), polyolefins, polyesters, and combinations thereof.

The inner downstream electrode 46 may be constructed of a material sufficiently conductive (and durable) for it to serve as an electrode in the manner described above. Accordingly, the material of which it is comprised is not particularly limited. In some such embodiments, the inner downstream electrode 46 is substantially porous so as to permit flow of fluid through the electrode. In some embodiments, average pore size of the inner downstream, electrode 46 is generally between about 1 µm and about 10 cm, typically between about 1 µm and about 5 cm, and more typically between about 5 µm and about 5 cm.

Like the inner downstream electrode 46, the outer upstream membrane electrode 44 is generally made of a material sufficiently conductive and durable for it to serve as an electrode. Accordingly, the material of which it is comprised is not particularly limited. In some such embodiments, the electrode 46 is substantially porous so as to permit flow of fluid through the electrode. In some embodiments, average pore size of the upstream (ground) electrode is generally between about 1 µm and about 10 cm, typically between about 1 µm and about 5 cm, or between about 5 µm and about 5 cm. In some embodiments, where the electrode 46 takes the form of a conductive mesh, the conductive mesh may exhibit a mesh size that corresponds to grids between about 1×1 µm and about 10×10 cm, typically between about 5×5 µm and about 10×10 cm, and more typically between about 5×5 µm and about 5×5 cm. The material of which the mesh is made is not particularly limited, except that it should possess sufficient electrical conductivity, and be sufficiently robust, so as to be durably operational in the wellbore environment in which it is placed.

In some such above-described embodiments, the at least one membrane-bearing tubular segment 40 comprises, in whole or in part, a sand control device. Care must be taken in selection of such devices or screens so that the material makeup and dimensional attributes of the component are consistent with those of the membrane-bearing tubular segment 40. Alternatively, the membrane-bearing tubular segment 40 may be constructed so as to act itself as a sand control device.

In some such above-described embodiments, the net, steady-state electrostatic potential is generally at least about 5 µV and at most about 500 kV, typically at least about 0.5 mV to at most about 100 kV, and more typically at least about 2 mV to at most about 50 kV.

Accordingly, in some such embodiments, the device 50 may draw power from an electrical storage device that is, in turn, charged by the electrical energy produced or alternatively powered from the surface by means of wires or other power delivery systems. The device 50 deriving power from the electrical energy may be selected from the group consisting of one or more of the following: a pressure sensor, a temperature sensor, a sliding sleeve, a valve, telemetry electronics, flow meter, fluid sensing device, and combinations thereof. A sliding sleeve or valve may be employed, optionally, to adjust the flow characteristics of a segment of the well to increase hydrocarbon production from the well. System embodiments may pass a substantially non-conductive hydrocarbon-based fluid through a membrane assembly in a membrane-bearing tubular segment.

The system further may comprise a telemetry subsystem operable for conveying device-generated data to, the surface. While wireless telemetry or electrically cabled means of communicating data are contemplated. In some embodiments recording devices are employed for batch analysis at some later time, wherein the recording devices are removed from the well and analyzed. In some embodiments, the telemetry subsystem and/or the recording device(s) is at least partially powered by means of electrostatic energy generated in the downhole environment In some embodiments, electromagnetic (EM) transmissions may be used to transmit data or power into and out of the cased wellbore. The downhole resonant circuits used in, such methods and systems may be integrated directly or indirectly with the one or fluid property analyzers, so as to convey information into and out of the well.

In some embodiments, acoustic pulse transmissions may be used to transmit data or power into and out of the wellbore. The downhole resonant circuits used in such methods and systems may be integrated directly or indirectly with the one or fluid property analyzers, so as to convey information into and out of the well.

The invention may be practiced otherwise than as specifically described without actually departing from the spirit and scope of the present invention as defined by the claims.

What we claim is:

1. A method of determining flow characteristics in at least one segment of a hydrocarbon-producing well, the method comprising the steps of:
    a) providing at least one tubular segment electrically connected to a device, the tubular segment comprising:
        i) an electrically-grounded outer upstream membrane electrode;
        ii) an inner downstream membrane electrode; and
        iii) a dielectric filter membrane, comprising flow channels, disposed between the inner and outer membrane electrodes;
    b) flowing a substantially non-conductive hydrocarbon-based fluid as a stream through the dielectric filter membrane in at least one segment of the well;
    c) generating an electric current and electrostatic potential between the stream and the dielectric filter membrane; and
    d) measuring the electric current or electrostatic potential to produce data correlating to at least one flow characteristic of the segment of the well.

2. The method of claim 1, wherein the flow characteristic of the segment of the well comprises a flow rate.

3. The method of claim 1, wherein the flow characteristic of the segment of the well comprises the ratio of water produced to the volume of total liquids produced.

4. The method of claim 1, comprising the additional step of:
    e) adjusting the device to alter a flow characteristic of the segment of the well to increase hydrocarbon production from the well.

5. The method of claim 1, wherein a plurality of segments are provided, wherein an electric current and electrostatic potential are produced separately for the plurality of segments, further wherein the measuring step includes the measurement of electric current or electrostatic potential for each of the respective plurality of segments.

6. The method of claim 5, wherein the method further comprises the steps of assessing flow characteristics in the respective plurality of segments of the well and adjusting at least one flow characteristic of the well to increase hydrocarbon production from the well.

7. A system for determining flow characteristics in at least one segment of a hydrocarbon-producing well by generation of electrostatic energy in at least one segment of the well, the system comprising:
    a) a plurality of connected tubular segments disposed within the well, wherein the tubular segments are useful in conveying hydrocarbon-based fluids from the well;
    b) at least one tubular segment being electrically connected to a device, the tubular segment comprising:
        i) an electrically-grounded outer upstream membrane electrode;
        ii) an inner downstream membrane electrode;
        iii) a dielectric filter membrane, comprising flow channels, disposed between the inner and outer membrane electrodes;
    c) an electrical lead establishing connectivity between the inner downstream membrane electrode and the device;
    d) a flow of substantially non-conductive hydrocarbon-based fluid, wherein said flow is directed through the plurality of connected tubular segments;
    e) wherein an electrical current and electrostatic potential exists between the electrically-grounded outer upstream membrane electrode and the inner downstream membrane electrode; and
    f) further wherein the electric current or electrostatic potential is measured to produce data correlating to at least one flow characteristic of the tubular segment.

8. The system of claim 7, wherein the flow characteristic comprises flow rate.

9. The system of claim 7, wherein the flow characteristic comprises the ratio of water produced to the volume of total liquids produced.

10. The system of claim 7, wherein a plurality of segments are provided, wherein an electric current and electrostatic potential are produced separately for the plurality of segments, further wherein the measuring step includes the measurement of electric current or electrostatic potential for the respective plurality of segments.

11. The system of claim 10, wherein the system further comprises the step of adjusting at least one flow characteristic of at least one segment of the well to increase hydrocarbon production from the well.

12. The system of claim 11, wherein the measuring step includes the measurement of electrostatic potential.

13. The system of claim 7, wherein the device comprises one or more of the following: electrical storage device, valve, sliding screen, flow meter, and a flow sensing device.

14. A system for determining flow characteristics in at least one segment of a hydrocarbon-producing well by generation of electrostatic energy in at least one segment of the well, the system comprising:
    a) a plurality of connected tubular segments disposed within the well, wherein the tubular segments are configured to convey hydrocarbon-based fluids from the well;
    b) at least one tubular segment being electrically connected to a device, wherein the device comprises one or more of the following: electrical storage device, valve, sliding screen, flow meter, and a flow sensing device;
    c) the tubular segment further comprising:
        i) an electrically-grounded outer upstream membrane electrode;
        ii) an inner downstream membrane electrode; and iii) a dielectric filter membrane, comprising flow channels, disposed between the inner and outer membrane electrodes;
d) an electrical lead establishing connectivity between the inner downstream membrane electrode and the device;
e) a flow of substantially non-conductive hydrocarbon-based fluid, wherein said flow is directed through the plurality of connected tubular segments;
f) wherein an electrical current and electrostatic potential exists between the electrically-grounded outer upstream membrane electrode and the inner downstream membrane electrode for one of the plurality of tubular segments; and
g) wherein the electric current or electrostatic potential is measured to produce data correlating to at least one flow characteristic of the tubular segment, the flow characteristic being either volume of total liquids produced or flow rate, or both.

15. The system of claim 14 wherein the system further comprises the step of adjusting the flow rate of at least one segment of the well by actuation of the device, to improve hydrocarbon production from the well.

* * * * *